United States Patent
Kursun et al.

(10) Patent No.: US 10,944,745 B2
(45) Date of Patent: Mar. 9, 2021

(54) SYSTEM AND METHOD FOR DEVICE AND TRANSACTION AUTHENTICATION

(71) Applicant: Bank of America Corporation, Charlotte, NC (US)

(72) Inventors: Eren Kursun, New York, NY (US); Neil David Zane, Wyckoff, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 224 days.

(21) Appl. No.: 16/211,405

(22) Filed: Dec. 6, 2018

(65) Prior Publication Data
US 2020/0186523 A1    Jun. 11, 2020

(51) Int. Cl.
*H04L 29/06* (2006.01)
*H04L 9/08* (2006.01)

(52) U.S. Cl.
CPC ........ *H04L 63/0876* (2013.01); *H04L 9/0894* (2013.01); *H04L 63/0861* (2013.01); *H04L 63/102* (2013.01); *H04L 2209/38* (2013.01)

(58) Field of Classification Search
CPC ............. H04L 2209/38; H04L 63/0861; H04L 63/0876; H04L 63/102; H04L 9/0894
See application file for complete search history.

(56) References Cited

U.S. PATENT DOCUMENTS

| | | | |
|---|---|---|---|
| 7,499,888 B1 | 3/2009 | Tu et al. | |
| 7,606,560 B2 | 10/2009 | Labrou et al. | |
| 8,095,519 B2 | 1/2012 | Delia et al. | |
| 8,151,335 B2 | 4/2012 | Wankmueller et al. | |
| 8,225,089 B2 | 7/2012 | Wang et al. | |
| 8,423,466 B2 | 4/2013 | Lanc | |
| 8,566,248 B1 | 10/2013 | Steele et al. | |
| 8,655,782 B2 | 2/2014 | Poon et al. | |
| 8,893,237 B2 | 11/2014 | Ganesan | |
| 9,542,542 B2 | 1/2017 | Giobbi et al. | |
| 9,712,528 B2 | 7/2017 | Gilboy | |
| 9,883,387 B2 | 1/2018 | Wilson et al. | |
| 10,616,324 B1 | 4/2020 | Kaddoura | |
| 2006/0212407 A1 | 9/2006 | Lyon | |

(Continued)

OTHER PUBLICATIONS

Nazri Abdullah • Anne Hakansson • Esmiralda Moradian; Blockchain based approach to enhance big data authentication in distributed environment; 2017 Ninth International Conference on Ubiquitous and Future Networks (ICUFN) (pp. 887-892); (Year: 2017).*

(Continued)

*Primary Examiner* — Luu T Pham
*Assistant Examiner* — Chao Wang
(74) *Attorney, Agent, or Firm* — Michael A. Springs; Moore & Van Allen PLLC; Seongun M. Hong

(57) ABSTRACT

The present disclosure is directed to a novel system for using unique device and user identifiers to perform authentication of a user, device, and/or transaction. In particular, the system may use device biometric profiles and/or user identifiers to generate a unique identifiable signature for each user and/or device. The unique signature may then be used to authenticate devices as well as transactions submitted by said devices. In this way, the system increases the security of device authentication by helping to prevent the use of device hijacking methods that circumvent conventional authentication practices.

16 Claims, 6 Drawing Sheets

(56) References Cited

U.S. PATENT DOCUMENTS

| | | |
|---|---|---|
| 2006/0265340 A1 | 11/2006 | Ziv et al. |
| 2011/0142234 A1 | 6/2011 | Rogers |
| 2011/0202466 A1 | 8/2011 | Carter |
| 2011/0276495 A1 | 11/2011 | Varadarajan et al. |
| 2012/0110341 A1 | 5/2012 | Beigi |
| 2013/0267200 A1 | 10/2013 | Weiner et al. |
| 2014/0337930 A1* | 11/2014 | Hoyos ............... G06F 21/34 726/4 |
| 2015/0113282 A1* | 4/2015 | Basil ............... H04L 9/3297 713/176 |
| 2017/0323301 A1 | 11/2017 | Weiss |
| 2018/0101560 A1 | 4/2018 | Christidis et al. |
| 2018/0267539 A1 | 9/2018 | Shih |
| 2019/0058581 A1 | 2/2019 | Wood |
| 2019/0075102 A1* | 3/2019 | Kim ............... H04L 9/3239 |
| 2019/0158272 A1 | 5/2019 | Chopra et al. |
| 2019/0236562 A1 | 8/2019 | Padmanabhan |
| 2019/0253239 A1 | 8/2019 | Shao et al. |
| 2019/0287200 A1 | 9/2019 | Schuler et al. |
| 2019/0289013 A1 | 9/2019 | Makmel et al. |
| 2019/0340269 A1* | 11/2019 | Biernat ............ G05B 19/41865 |
| 2019/0354723 A1 | 11/2019 | Dassenno |
| 2020/0019616 A1 | 1/2020 | Sukhija et al. |
| 2020/0053077 A1* | 2/2020 | Merrell ............ H04L 63/0861 |
| 2020/0110812 A1 | 4/2020 | Kamijoh |
| 2020/0134760 A1 | 4/2020 | Messerges et al. |
| 2020/0213087 A1 | 7/2020 | Mazzarella |

OTHER PUBLICATIONS

Panarello, Alfonso • Tapas, Nachiket • Merlino, Giovanni • Longo, Francesco • Puliafito, Antonio; Blockchain and IoT Integration: A Systematic Survey; Sensors (Basel, Switzerland), 18(8), 2575; (Year: 2018).*

Francesco Restuccia • Salvatore D'Oro • Tommaso Melodia; Securing the Internet of Things in the Age of Machine Learning and Software-Defined Networking; IEEE Internet of Things Journal (vol. 5, Issue: 6, pp. 4829-4842); (Year: 2018).*

Masood et al., "Consensus Algorithms in Distributed Ledger Technology for Open Environment", Dec. 1, 2018 4th International Conference on Computing Communication and Automation (ICCCA), IEEE, 6 pages (2018).

Tosh et al., "CloudPoS: A Proof-of-Stake Consensus Design for Blockchain Integrated Cloud", IEEE, pp. 302-309 (2018).

Rohan Pinto; "How Blockchain Can Solve Identity Management Problems" retrieved from the internet on Nov. 20, 2019 at https://www.forbes.com/sites/forbestechcouncil/2018/07/27/how-blockchain-can-solve-identity-management-problems/#43facbc513f5 ; https://www.intrinsic-id.com/wp-content/uploads/2017/05/gt_KSI-PUF-web-1611.pdf.

* cited by examiner

SYSTEM AND METHOD FOR DEVICE AND TRANSACTION AUTHENTICATION

FIELD OF THE INVENTION

The present disclosure embraces a system, controller, and computer-implemented method for device and transaction authentication. In particular, the system may use hybrid device and user biometrics in conjunction with an immutable blockchain ledger to perform secure authentication of a user, device, and/or transaction.

BACKGROUND

Current user authentication methods may be susceptible to device-specific vulnerabilities, such as SIM card swapping and/or hacking. The SIM card vulnerability is especially problematic considering the pervasiveness of smartphone use in authenticating users within current technological environments. Accordingly, there is a need for a more secure way to authenticate users and devices.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for using a distributed blockchain ledger to perform authentication of a user, device, and/or transaction. In particular, the system may use device biometric profiles and/or user identifiers to generate a unique identifiable signature for each user and/or device. The unique signature may then be used to authenticate devices as well as transactions submitted by said devices. Furthermore, the system may use a heterogeneous blockchain system comprising a series of non-uniform blockchain nodes that may differ in functionality and/or positions of hierarchy. Said non-uniform nodes may further be organized into groups and/or subgroups with custom weight inputs/outputs which alter the degree to which the nodes, groups, and/or subgroups influence the blockchain consensus. In this way, the system increases the security of device authentication by helping to prevent the use of device hijacking methods that circumvent conventional authentication practices.

Accordingly, embodiments of the present disclosure provide a system for device and transaction authentication. The system may comprise a processor; a communication interface; and a memory having executable code stored thereon. The executable code, when executed by the processor, causes the processor to receive user identifier data from a user; receive device identifier data from a device associated with the user, wherein the device identifier data comprises device biometric data; and generate a unique signature profile from the user identifier data and a device identifier data.

In some embodiments, the device biometric data comprises hardware characteristics tracked over time, the hardware characteristics comprising response time, performance, battery degradation speed, chip variations, hardware imperfections, or unique memory identifiers.

In some embodiments, the hardware characteristics comprise immutable hardware characteristics, the immutable hardware characteristics comprising manufacturing imperfections, the manufacturing imperfections comprising variability, functional defects, or wear characteristics.

In some embodiments, the device identifier data further comprises software characteristics, the software characteristics comprising device applications, screen resolutions, or operating system versions.

In some embodiments, the user identifier data comprises user biometric data.

In some embodiments, the device identifier data and the user identifier data are stored within a blockchain.

In some embodiments, the executable code further causes the processor to receive an authentication request from a second device associated with a second user; receive user authentication credentials from the second user; receive device authentication credentials from the second device; determine that the user authentication credentials match the user identifier data; determine that the device authentication credentials do not match the device identifier data; receive from the user a request to add the second device as a trusted device; and inject second device identifier data as reference data into the blockchain, wherein the second device identifier data comprises identifier data associated with the second device.

In some embodiments, the executable code further causes the processor to receive an authentication request from the device associated with the user; receive user authentication credentials from the user; receive device authentication credentials from the device associated with the user; determine that the user authentication credentials do not match the user identifier data; determine that the device authentication credentials match the device identifier data; and prompt the user to provide additional user authentication credentials.

In some embodiments, the executable code further causes the processor to receive an authentication request from the device associated with the user, wherein the authentication request comprises a requested action; receive user authentication credentials from the user; receive device authentication credentials from the device associated with the user; determine that the user authentication credentials match the user identifier data; determine that the device authentication credentials match the device identifier data; and authorize the user to complete the requested action.

Embodiments of the present disclosure also provide a system for device and transaction authentication, wherein the system may comprise a processor; a communication interface; and a memory having executable code stored thereon. The executable code, when executed by the processor, causes the processor to generate a unique device identifier profile for a device associated with a user; continuously detect device identifier data from the device, wherein the device identifier data comprises hardware characteristics of the device; and add a detected hardware characteristic to the unique device identifier profile.

In some embodiments, the executable code further causes the processor to continuously collect historical interaction data associated with the device; and add the historical interactional data to the unique device identifier profile.

In some embodiments, the hardware characteristics comprise response time, performance, battery degradation speed, chip variations, hardware imperfections, or unique memory identifiers.

In some embodiments, the hardware characteristics comprise immutable hardware characteristics, the immutable hardware characteristics comprising manufacturing imperfections, the manufacturing imperfections comprising variability, functional defects, or wear characteristics.

In some embodiments, the device identifier data further comprises software characteristics, the software characteristics comprising device applications, screen resolutions, or operating system versions.

In some embodiments, the unique device identifier profile is stored within a blockchain.

Embodiments of the present disclosure also provide a computer-implemented method for device and transaction authentication. The method may comprise receiving user identifier data from a user; device identifier data from a device associated with the user, wherein the device identifier data comprises device biometric data; and generating a unique signature profile from the user identifier data and a device identifier data.

In some embodiments, the device biometric data comprises hardware characteristics tracked over time, the hardware characteristics comprising response time, performance, battery degradation speed, chip variations, hardware imperfections, or unique memory identifiers.

In some embodiments, the hardware characteristics comprising immutable hardware characteristics, the immutable hardware characteristics comprising manufacturing imperfections, the manufacturing imperfections comprising variability, functional defects, or wear characteristics.

In some embodiments, the device identifier data further comprises software characteristics, the software characteristics comprising device applications, screen resolutions, or operating system versions.

In some embodiments, the user identifier data comprises user biometric data.

Device Biometrics

Devices (due to manufacturing process) have intrinsic and unique hardware characteristics that can be used to uniquely identify them. These characteristics are not alterable and they cannot be replicated. For instance the chip variation or hardware faults on a multi-core chip in a smart phone cannot be replicated or mimicked by other devices. This makes it an immutable, unique identifier.

Combination of Device Biometrics with User Identifiers

By combining the unique signature (such as biometrics, digital signatures, tokens, or the like) of the user with the unique signature of the device, a combined signature is generated. This combined signature prevents various cases of unauthorized access (e.g., SIM hijacking).

Non-Uniform Blockchain Nodes and Functionality

Different from standard blockchain solutions with same functionality in each node, the proposed solution relies on different nodes that have different functionality. As a result, each node has a unique profile which is then used to combine the stakes (e.g., consensus inputs) of the individual entities.

Hybrid and Hierarchical Decisioning Using Trusted Devices of User and Entity

By combining intelligent nodes from an entity with trusted devices of the user, and other nodes selected accordingly, this system creates a hybrid Proof of Stake based blockchain. Each node in the blockchain, depending on the entities they are associated with (such as wireless carrier, financial institution, regulator, client, client trusted contacts, or the like) may have different roles. The blockchain actions such as decisioning (or consensus alternative) is also achieved by factoring the roles, owners of the identities, and trustworthiness of the individual nodes.

Custom Weights Per Node and Subgroup

Custom weights may be assigned per node, group, and/or subgroup. For instance, weights may be calculated by exemplary Function $f(bi)=f$ (Node_1 (Owner, Identity, Verification capabilities, Historical data reference, Trustworthiness and Security score), . . . , Node_N (Owner, Identity, Verification capabilities, Historical reference, Trustworthiness Score, Security Score)). Accordingly, the system features hierarchical decision making using the sub-groups of the Blockchain, where certain groups, subgroups, and/or nodes may provide consensus inputs on the decisions of other groups, subgroups, and/or nodes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
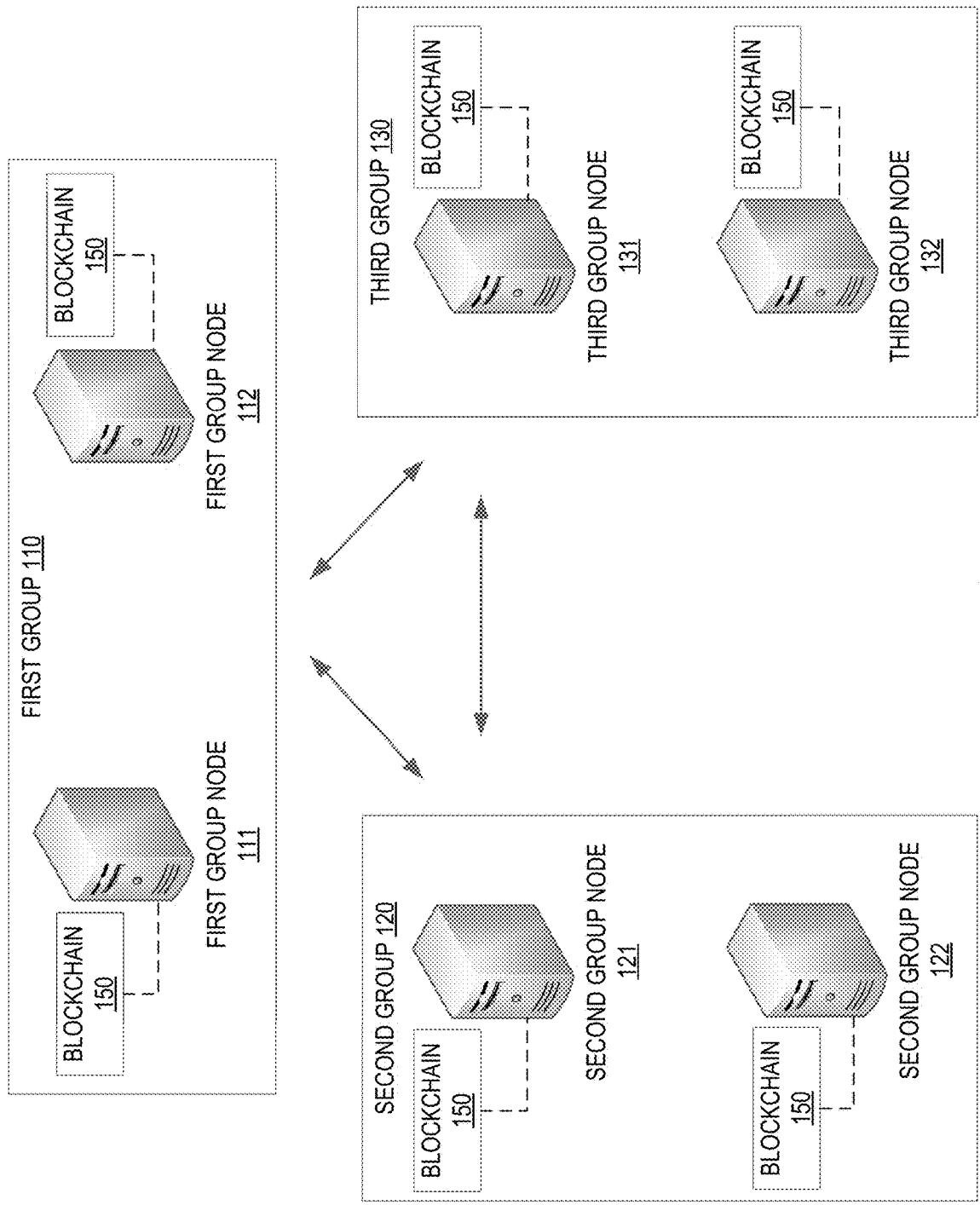
Figure 2:
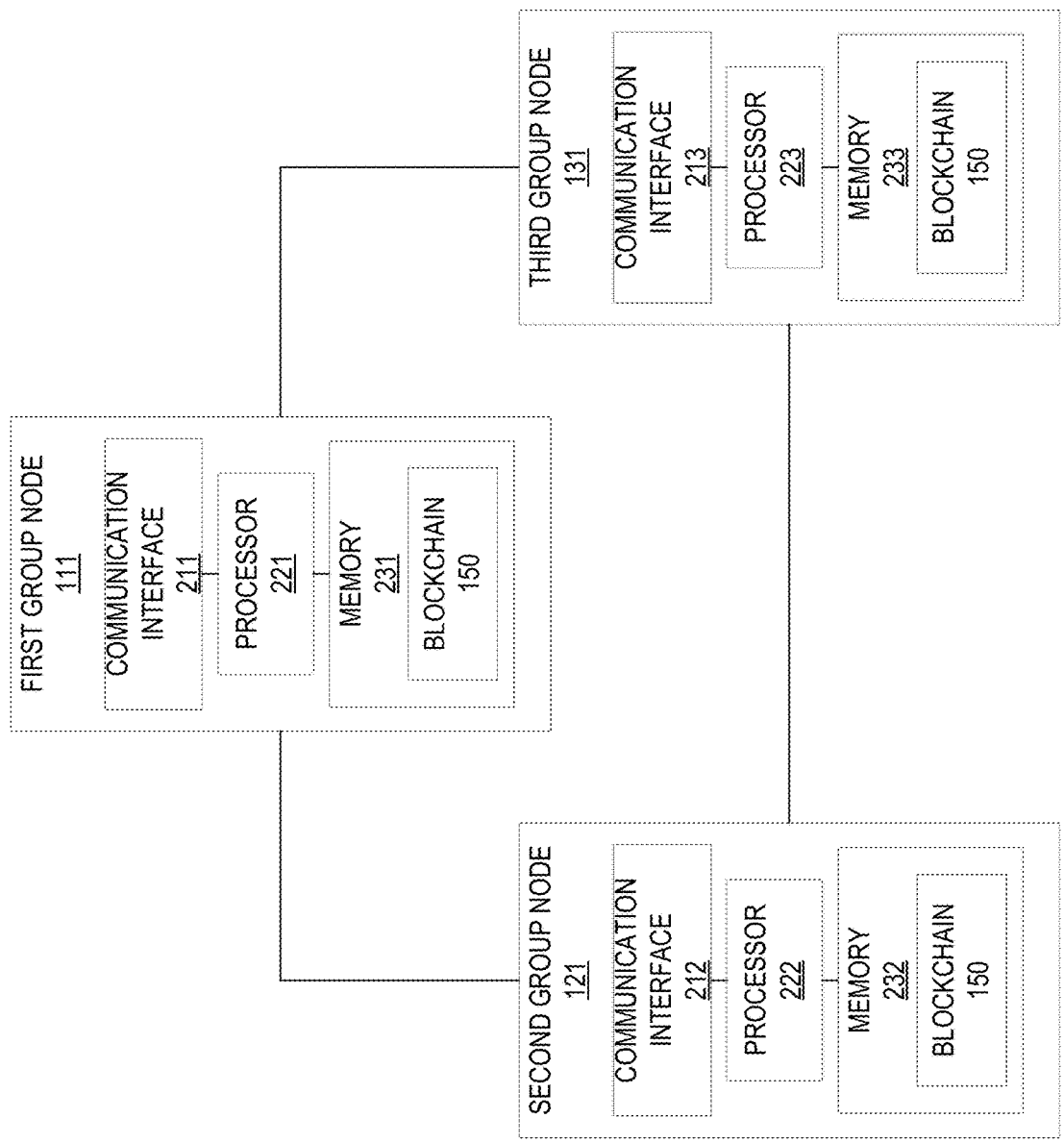
Figure 3:
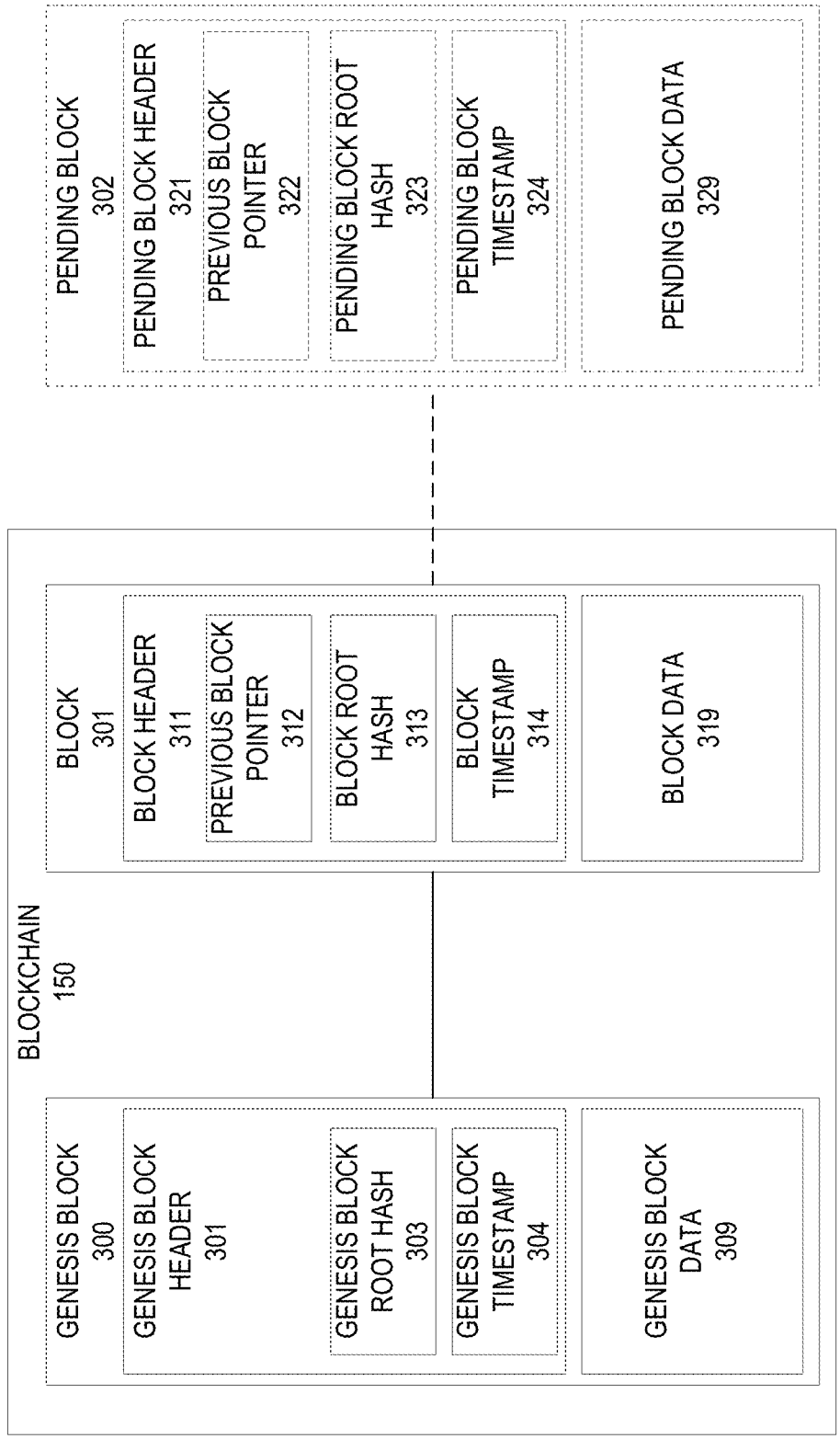
Figure 4:
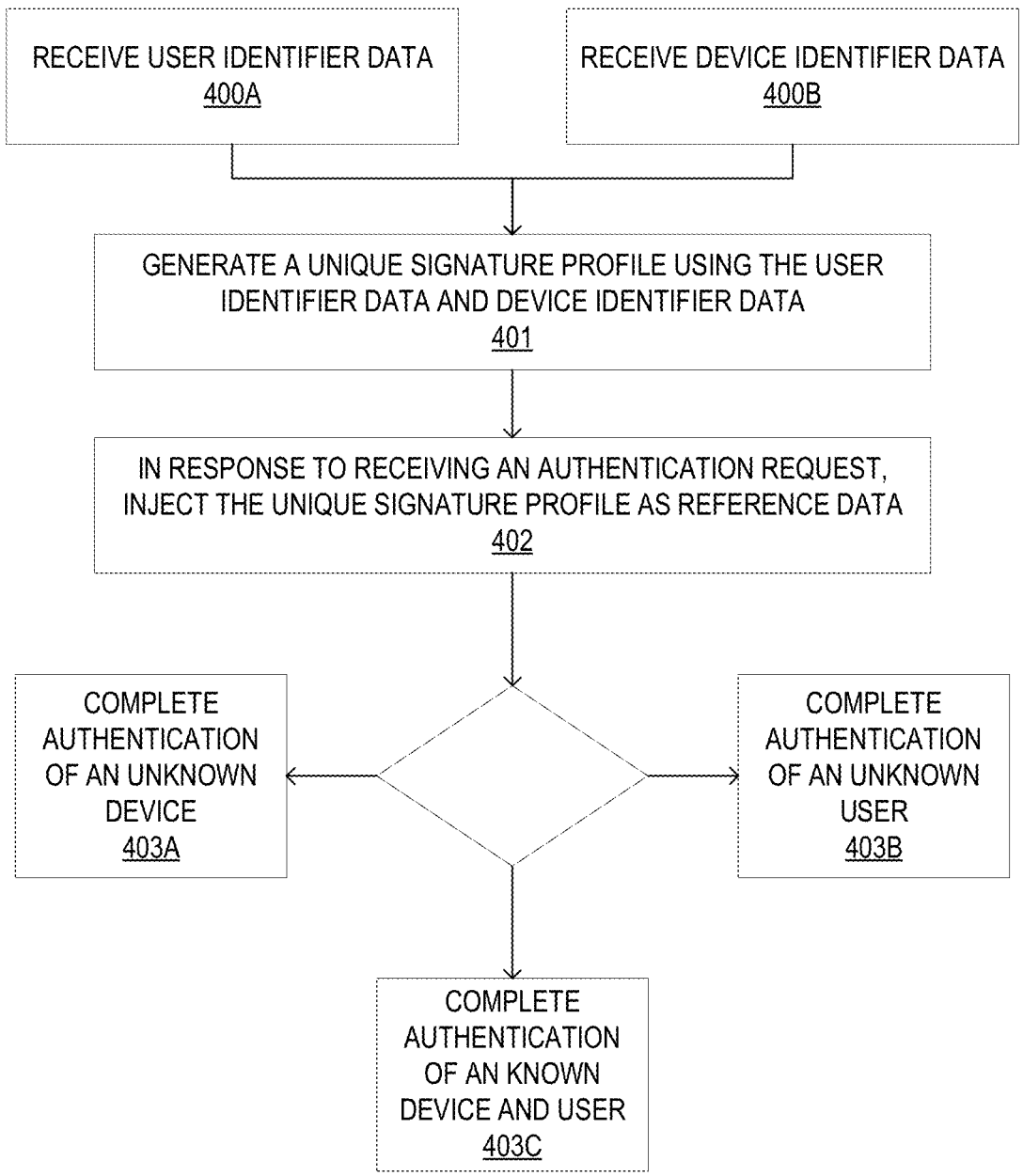
Figure 5:
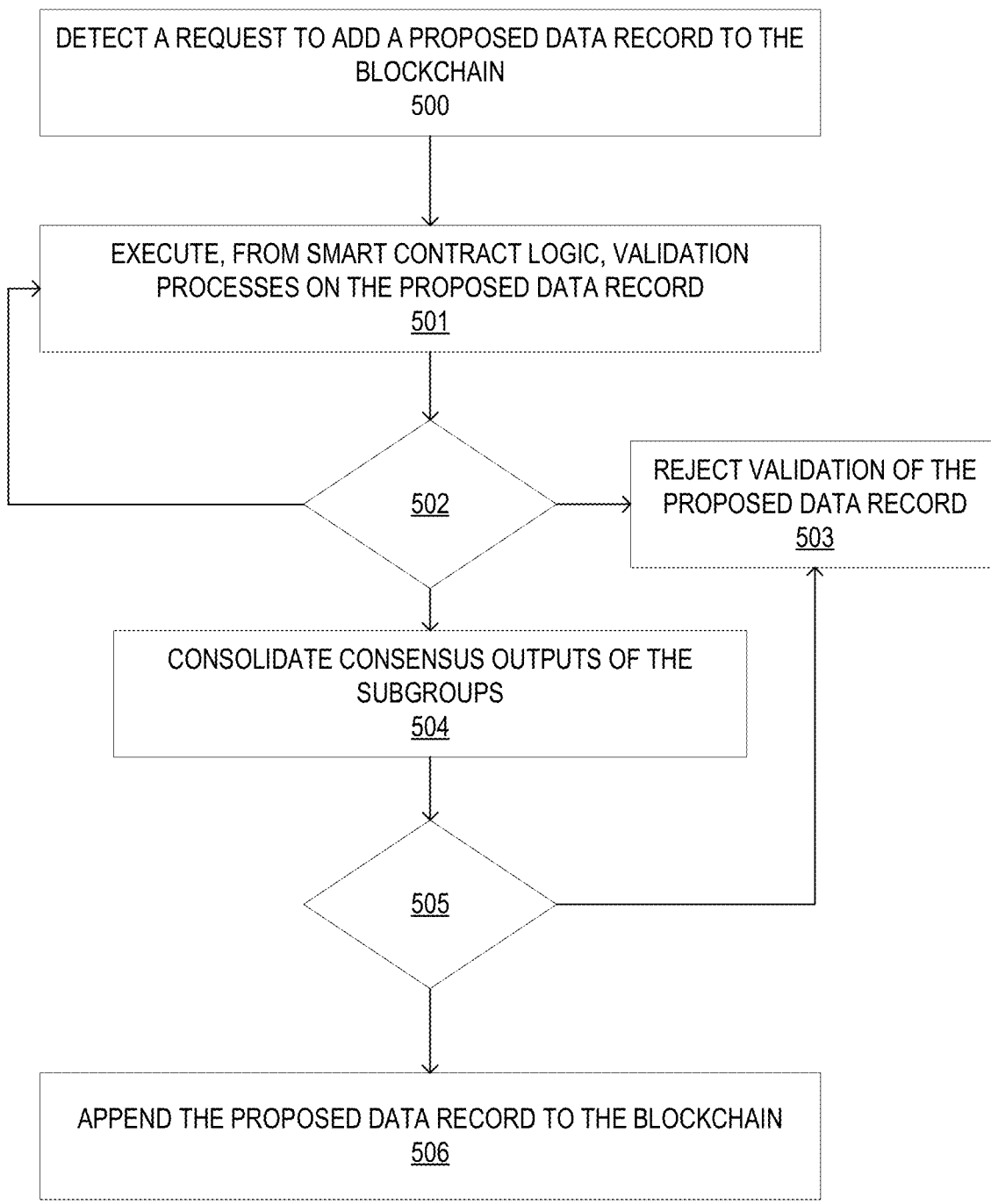
Figure 6:
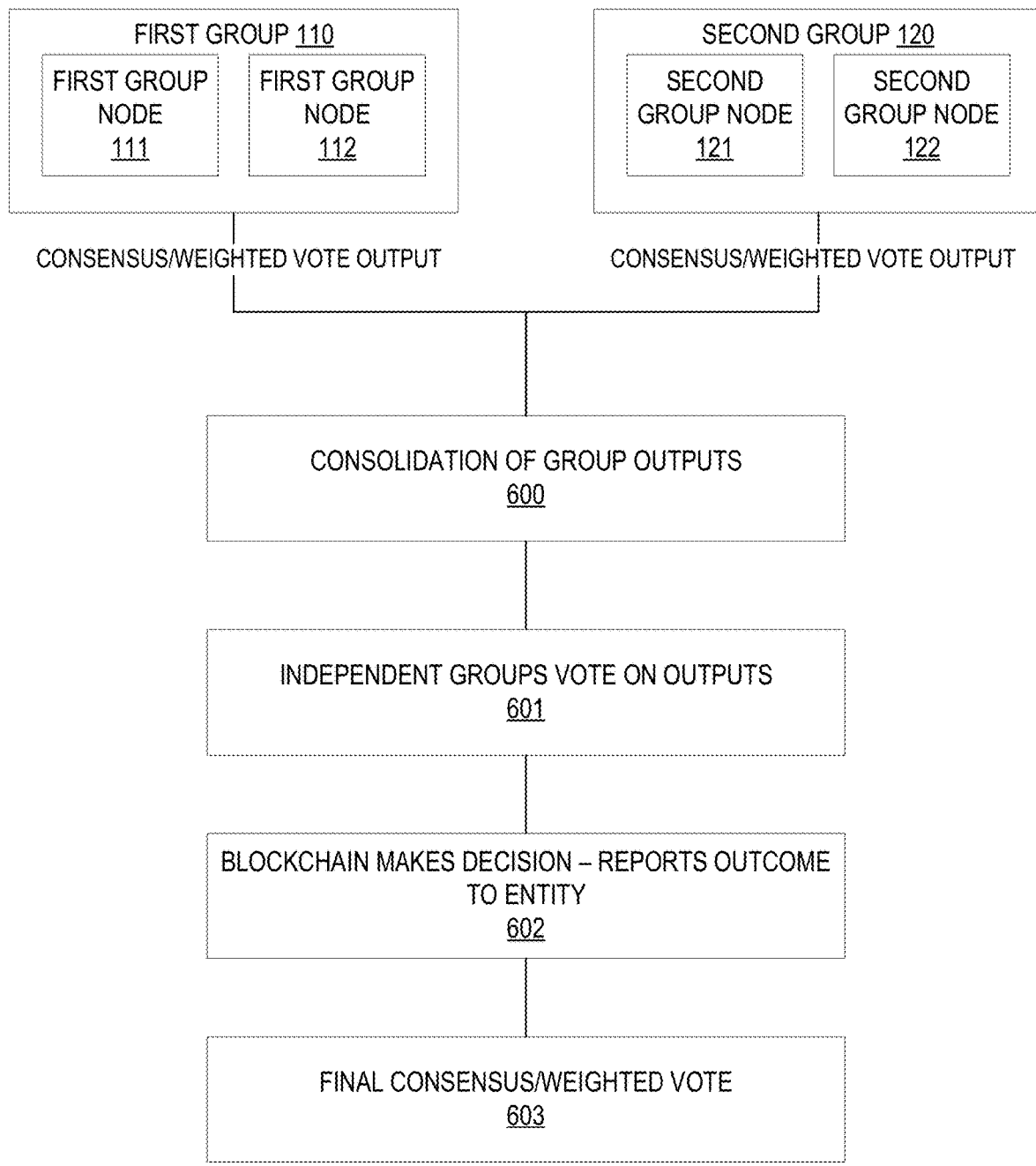

Having thus described embodiments of the disclosure in general terms, reference will now be made to the accompanying drawings, wherein:

FIG. 1 is a block diagram illustrating an operating environment for the blockchain-based authentication system, in accordance with some embodiments of the present disclosure;

FIG. 2 is a block diagram illustrating the first group node, the second group node, and the third group node in more detail, in accordance with some embodiments of the present disclosure;

FIG. 3 is a block diagram illustrating the data structures within an exemplary blockchain ledger, in accordance with some embodiments of the present disclosure;

FIG. 4 is a process flow for generating a unique signature profile for authentication, in accordance with some embodiments of the present disclosure;

FIG. 5 is a process flow for validating data records in a hybrid blockchain, in accordance with some embodiments of the present disclosure; and FIG. 6 is a process flow for validating data records via weighted group consensus outputs, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the blockchain-based authentication system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to perform blockchain-based authentication of devices and transactions. Accordingly, the entity system may comprise blockchain database servers, Internet-of-Things ("IoT") devices, networked terminals, smart devices (e.g., smart watches), and/or other types of computing systems or devices along with their associated applications.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Distributed ledger" or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid blockchain such that certain nodes may store certain segments of the blockchain but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

Embodiments of the present disclosure provide a blockchain based device and transaction authentication system to prevent unauthorized access to user accounts and/or devices. In particular, the system may use device biometrics, user biometrics, or a combination thereof to create a unique signature of a user and/or device which may be used to increase account and device security. The system may further use a blockchain ledger with custom consensus rules and/or node roles to manage user account interactions. The components of the blockchain based authentication system will be discussed in turn.

Device and User Biometrics

The system may use a device's unique signature to positively identify trusted and/or authorized devices which the user may use to access the entity system, such as the user's smartphone. The device's signature may comprise the device model, component and/or device serial numbers or other identifiers, date of manufacture, or the like. The device signature may further comprise unique behavioral characteristics of the device. As computing devices are manufactured according to certain technical specifications, variations in device hardware characteristics may exist within the range of specified acceptable tolerances. As a result, even two identical device models may exhibit detectable differences in response times, battery degradation speed, reliability, stability, processing power, memory speed, device wear characteristics, or the like.

The system may continuously track the hardware characteristics of a trusted user's device over the course of the device's interactions with the entity system. For instance, the entity system may track the response time of the device, the time that the device takes to load a program or website hosted by the entity, the battery life curve of the device over time, or the like. In addition to hardware behavior, the system may further track software and/or application behavior of the device. For instance, the system may detect the device's software applications, drivers, kernels, display resolution, operating system, software versions, or the like. By tracking said software characteristics of the device, the system may develop a software profile to be incorporated into the device's overall behavior profile. Over time, the specific behavioral characteristics of the device may become a unique, powerful indicator of the identity of the device. Thus, when the behavioral characteristics of the device is combined with the other device identifiers (e.g., model number, serial number, or the like), the system may generate a highly specific device signature such that unauthorized users may be successfully detected even when using a device with the same make and model as the trusted device.

In addition to device biometrics, the system may also continuously track identifier data of the user, such as biometric data, behavior data, and the like. For instance, the system may track biometric data such as fingerprint data, eye scan data, voice data, facial image data, or the like, and/or behavior data from interactions of the user with the entity system, such as features accessed, timing and/or speed of inputs, browsing habits, transaction history, location data, or the like. In some embodiments, the identifier data may further include secured tokens, digital signatures, certificates, or the like which may be stored on the device to be authenticated.

The system may then link the device biometric data with the user identifier data to create a hybrid device-user identifier profile which serves as a unique digital signature for the device and user. Accordingly, said unique digital signature may comprise the individual components of both the device biometric profile and the user identifier profile; each individual component may be read by the system and considered when verifying the identity of the device and user. In this way, in comparison to conventional methods, the system creates a significantly improved authentication paradigm which may not be easily defeated by currently available vulnerabilities, such as SIM hacking and/or swapping.

Hybrid Blockchain with Non-Uniform Nodes and Consensus

The system may comprise a hybrid blockchain ledger maintained on non-uniform distributed ledger nodes using hybrid and hierarchical consensus mechanisms. The blockchain ledger may comprise the unique identifier profiles and user account data as described above in addition to information about "trusted" personal devices added by the user. For example, a user may add a number of household computing devices as a trusted device to access the entity system, such as personal computers, wearable devices, IoT devices, smart hubs, SBC's, AI assistants, or the like. The nodes which host the blockchain ledger may be selected from a pool of trusted nodes, which may include nodes belonging to the entity, one or more trusted personal devices of the user, and/or third party nodes such as those belonging to wireless service providers, government and/or regulatory agencies, disinterested third party entities, or the like.

The system may require that for certain actions taken by the user within the entity system (e.g., actions which require the user and/or the user's device to be authenticated), a proposed data record is submitted to the nodes to be appended to the blockchain ledger. For instance, the system may require that a request to add a proposed data record is submitted to the nodes when a user attempts to change account information, add or remove trusted devices and/or nodes, conduct transactions, access sensitive data such as account history data or location data, or the like. The nodes may then, via a consensus mechanism, determine the validity of the proposed data record and subsequently decide whether or not the proposed data record should be accepted and appended to the blockchain ledger. The nodes may use a number of validation checks to verify the validity of the proposed data record, including verifications of whether the request is consistent with the device biometric data and/or user identifier data, whether the request was submitted by a trusted device, whether the request is consistent with the user's past interactions with the entity system and/or other devices, or the like.

In an exemplary scenario, an unauthorized user may attempt to change a user's contact information during a voice call with an entity's representative. Upon detecting that the request is being submitted using a device which is not a trusted personal device of the user or fails to positively match any device biometric data stored within the blockchain ledger, the request may be rejected by the nodes, thereby precluding the proposed data record from being written to the blockchain. Accordingly, the entity representative may reject or provisionally reject the request until further authentication of the user and/or device may be conducted.

The nodes of the hybrid blockchain may use a non-uniform consensus mechanism. In this regard, the nodes may store different segments of the blockchain and/or serve different functions within the data record validation process. For example, certain nodes may store reference data to be used in the validation process (e.g., nodes owned by the entity or third parties), while other nodes may not store reference data but may regulate the consensus process using other types of data as described herein or validate the outputs (e.g., the consensus result) of the remaining decision-making nodes. Certain nodes may further perform different validation functions. For instance, particular nodes may verify proposed data records against historical data and/or user interaction data, while others may use device and/or user biometric data to verify proposed data records.

In some embodiments, the consensus algorithm may be a Proof-of-Stake type consensus algorithm in which consensus is dictated in part by the "stake" that an entity has in the blockchain system. In other words, the nodes' stakes may determine which nodes or groups of nodes determine the validity of proposed data records and which nodes serve as consensus verifiers (e.g., nodes that check the outputs of the consensus mechanism for validity). The "stake" as described herein may be an amount of digital currency, reputation levels, trust levels, or the like. In such embodiments, certain nodes or groups of nodes may have higher stake values than other nodes or groups of nodes. For instance, if certain nodes or groups of nodes have higher trust values (e.g., stake values), then said nodes may have a greater authority to validate proposed data records than other nodes with lower stake values. The amount of stake may depend on which party owns the nodes (e.g., the user, the entity, third parties, or the like), the trustworthiness or reliability of the nodes, the security measures employed by the nodes, or the like. In an exemplary embodiment, the entity's nodes may have higher stake levels than the user's personal nodes, as the entity's nodes are more resistant to unauthorized hijacking and are thus more trustworthy sources of verification data.

In this regard, nodes may be organized into groups and/or sub-groups. The system may subsequently assign custom weights to the groups and/or sub-groups, where the weights are stored as smart contract logic on the nodes. In such embodiments, certain groups may have greater weights assigned to them based on their greater stake in the system such that the consensus outputs of said groups have a greater effect on the consensus outcome (e.g., to accept or reject the proposed data record). For instance, if the consensus mechanism includes the counting of consensus inputs submitted by certain nodes, groups with greater weights may have the ability to submit a greater number of consensus inputs to be considered in the consensus process. In an exemplary embodiment, the entity's nodes may have a greater trustworthiness than nodes belonging to the user, and thus may be able to receive greater weight in consensus. In some embodiments, certain groups may be assigned to evaluate the consensus outputs of other groups. In such embodiments, the evaluating nodes may assess the consolidated consensus outputs of the other groups and validate the outputs.

The system as disclosed herein addresses a number of technology-centric challenges associated with performing authentication of users and/or devices. By using a unique signature associated with device and user biometric data, the system may address currently existing authentication security vulnerabilities, particularly those that target the user's smartphones or mobile devices. Furthermore, a hybrid blockchain ledger and custom consensus rules in this manner may create an additional layer of security to an entity's authentication procedures while providing a reliable, immutable source of "true" data with respect to a user's account.

Turning now to the figures, FIG. 1 is a block diagram illustrating an operating environment for the blockchain-based authentication system, in accordance with some embodiments of the present disclosure. In particular, the operating environment may include a plurality of blockchain nodes 111, 112, 121, 122, 131, 132 in operative communication with one another within a network. The blockchain network, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The nodes 111, 112, 121, 122, 131, 132, along with any other nodes as described herein, may be computing systems which host the blockchain 150. The nodes may be split into one or more groups or subgroups as described elsewhere herein. As depicted in FIG. 1, for instance, the operating environment may comprise a first group 110 comprising one or more first group nodes 111, 112, a second group 120 comprising one or more second group nodes 121, 122, and a third group 130 comprising one or more third group nodes 131, 132. Each of the nodes may host at least a portion of the blockchain ledger 150. In some embodiments, each node hosts a complete copy of the blockchain 150, where each copy of the blockchain 150 hosted on the various nodes are updated to be consistent with one another via a consensus algorithm executed by the nodes. In this way, a complete and verified copy of the blockchain ledger 150 may remain accessible even if the copy of the blockchain 150 stored on one or more blockchain nodes become inaccessible (e.g., due to being offline, experiencing high network latency, or the like) or corrupted (e.g., due to hardware/software errors, unauthorized modification of blockchain contents, or the like). In other embodiments, certain nodes or groups of nodes may host a portion of the blockchain 150, but not a complete copy. For instance, the second group 120 of nodes 121, 122 may host certain data records that are not hosted by the first group 110 of nodes 111, 112.

Each group may represent nodes which are owned and/or operated by different entities. In an exemplary embodiment, the first group 110 may comprise first group nodes 111, 112 owned by an entity such as a financial institution. In such an embodiment, the first group nodes 111, 112 may represent dedicated blockchain nodes (e.g., networked servers) within the entity system. The second group 120 may comprise second group nodes 121, 122 which are owned by a user (e.g., a client of the entity), where the second group nodes 121, 122 are personal computing devices of the user (e.g., smartphones, desktop computers, laptop computers, IoT devices, wearable smart devices, stationary smart devices, or the like). The third group 130 may comprise third group nodes 131, 132 which are owned by a trusted third party, such as a wireless service provider, regulatory or government agency, family member, or the like.

In some embodiments, each of the nodes may serve different roles in hosting the blockchain 150 and participating in consensus. For instance, each node may be characterized according to the entity to which the node belongs, the node's capabilities and/or unique characteristics (e.g., performance characteristics, baseline capabilities, history of interactions, or the like), reference data and verification capabilities (e.g., reference data and analytical capabilities to verify proposed data records), trustworthiness and security score (e.g., the entity to which the node belongs, the security configuration and/or policies of the node, reference data quality, or the like). For example, a node owned by a financial institution may be subject to higher security and/or regulatory standards such that the node is more trustworthy than other nodes (e.g., those belonging to the user). Accordingly, the consensus inputs/outputs of the entity's nodes may be granted a higher weight than the inputs/outputs from other nodes.

In some embodiments, the nodes may further be categorized into subgroups. In such embodiments, nodes of certain subgroups may be tasked with validating the consensus outputs of other subgroups. In an exemplary scenario, a first subgroup and second subgroup of nodes may evaluate a proposed data record in accordance with the consensus mechanism and/or smart contract logic, where the outputs of the first subgroup into the consensus mechanism may be assigned greater weights than the outputs of the second subgroup (e.g., the first subgroup has a greater influence on the consensus). The consensus outputs of the first subgroup and second subgroup may then be consolidated, after which the third subgroup (e.g., an independent subgroup) may evaluate the consolidated consensus outputs of the first subgroup and second subgroup. Based on the decision of the independent subgroup, the proposed data record may be accepted or rejected from being added to the blockchain ledger.

It should be understood by those having ordinary skill in the art that although the nodes 111, 112, 121, 122, 131, 132 are depicted in FIG. 1 as single units, each of the depicted components, or sub-components therein, may represent multiple units. For instance, in some embodiments, a given computing system as depicted in FIG. 1 may represent multiple systems configured to operate in a distributed fashion (e.g., the first group node 111 or 112 may represent multiple first group nodes). In other embodiments, the functions of multiple computing systems may be accomplished by a single system. For instance, the functions of the first group node 111 and 112 may be accomplished by a single first group node. It should further be understood that even though reference may be made to a single "blockchain," all singular usages of "blockchain" may also refer to multiple blockchain ledgers. For instance, though reference is made to a single blockchain 150 hosted on the nodes, the blockchain 150 may represent multiple individual blockchains stored on a per-user, per-account, or per-device basis, or the like.

FIG. 2 is a block diagram illustrating the first group node 111, the second group node 121, and the third group node 131 in more detail, in accordance with some embodiments of the present disclosure. The first group node 111 may comprise a processor 221 communicably coupled to such devices as a communication interface 211 and a memory 231. It should be understood that the first group node 111 as depicted in FIG. 2 may represent either or both of the first group nodes 111, 112 as depicted in FIG. 1. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The first group node 111 may use the communication interface 211 to communicate with other devices over the network. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the first group node 111 may comprise a copy of the blockchain 150. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. In some embodiments, the memory 231 of the first group node 111 may further comprise smart contract logic for performing node-specific tasks in the consensus process.

In some embodiments, the first group node 111, along with the other nodes within the blockchain network, may maintain a complete copy of the blockchain 150. In this regard, the first group node 111 may be configured to communicate with the other nodes to determine the contents of the blockchain 150 stored thereon. For instance, the nodes within the blockchain network may use one or more consensus algorithms (e.g., Proof-of-Work, Proof-of-Stake, Practical Byzantine Fault Tolerance, or the like) to add proposed data records to each of the individual copies of the blockchain 150. In other embodiments, the nodes may execute smart contract logic to add proposed data records.

In other embodiments, the first group node 111 may store a portion of the blockchain 150 which may be different from the copies of the blockchain stored on other nodes. In this regard, the copy of the blockchain 150 stored in the memory 231 of the first group node 111 may contain data records that are not found in the copies of the blockchain 150 stored on other nodes, and vice versa. The types of data records stored on a particular node (e.g., the specific portion of the blockchain) may be determined based on the sensitivity of the data to be stored, the trustworthiness of the node, regulatory concerns, and the like.

The second group node 121, like the first group node 111, may also comprise a processor 222 communicatively coupled with such devices as a communication interface 212 and a memory 232 having a blockchain 150 stored thereon. As described above, the copy of the blockchain 150 stored in the memory 232 of the second group node 121 may in some embodiments be a complete copy of the blockchain 150 which is identical to other copies stored on other nodes, while in other embodiments, the memory 232 may store a unique partial copy of the blockchain 150 on the second group node 121.

In some embodiments, the second group node 121 may be a node owned and/or operated by the user, who may be a client of the entity. In such embodiments, the second group node 121 may further comprise a user interface, which may comprise the hardware and software implements to accept input from and provide output to the user. The user interface may comprise hardware such as a display, audio output devices, projectors, and the like, or input devices such as keyboards, mice, sensors, cameras, microphones, biometric input devices (e.g., fingerprint readers), and the like. The user interface may further comprise software such as a graphical or command-line interface through which the user may provide inputs and/or receive outputs. It should be understood that the display on which the user interface is presented may include an integrated display (e.g. a tablet or smartphone screen) or an external display device (e.g. a computer monitor or television).

Similar to the other nodes depicted in FIG. 2, the third group node 131 may comprise a communication interface 213, a processor 223, and a memory 233 having a copy of the blockchain 150 stored thereon. In some embodiments, the third group node 131 may be owned and/or operated by a third party entity such as the user's wireless service provider, trusted third party (e.g., family members, relatives, or the like), a regulatory agency, or the like. Accordingly, the type of computing system of the third group node 131 may change based on the identity of the third party entity. For example, if the third party entity is a trusted family member, the third group node 131 may be a personal device belonging to the family member. On the other hand, if the third party entity is a wireless provider, the third group node 131 may be a networked server within the service provider's premises. Furthermore, the contents of the copy of the blockchain 150 stored in the memory 233 of the third group node 131 may also change depending on the identity of the third party entity. For example, the blockchain 150 stored on the third group node 131 may have a certain set of data records if the third party is a regulatory agency, while having other sets of data records if the third party is a relative of the user.

FIG. 3 is a block diagram illustrating the data structures within an exemplary blockchain ledger 150, in accordance with some embodiments. In particular, FIG. 3 depicts a plurality of blocks 300, 301 within the blockchain 150, in addition to a proposed block 302 that has been submitted to be appended to the blockchain 150. The blockchain 150 may comprise a genesis block 300 that serves as the first block and origin for subsequent blocks in the blockchain 150. The genesis block 300, like all other blocks within the blockchain 150, comprise a block header 301 and block data 309. The genesis block data 309, or any other instances of block data any blocks in the blockchain 150 may contain various data records. For instance, block data may comprise reference data (e.g., user account data, historical data, trust/reputation data, or the like), device biometric data, user biometric data, unique identifiers and/or signatures, combined device and user biometric profiles, third party information, regulatory and/or legal data, or the like.

The genesis block header 301 may comprise various types of metadata regarding the genesis block data 309. In some embodiments, the block header 610 may comprise a genesis block root hash 303, which is a hash derived from an algorithm using the genesis block data 309 as inputs. In some embodiments, the genesis root hash 303 may be a Merkle root hash, wherein the genesis block root hash 303 is calculated via a hash algorithm based on a combination of the hashes of each data record within the genesis block data 309. In this way, any changes to the data within the genesis block data 309 will result in a change in the genesis block root hash 303. The genesis block header 301 may further comprise a genesis block timestamp 304 that indicates the time at which the block was written to the blockchain 150. In some embodiments, the timestamp may be a Unix timestamp. In some embodiments, particularly in blockchains utilizing a PoW consensus mechanism, the block header 301 may comprise a nonce value and a difficulty value. The nonce value may be a whole number value that, when combined with a hash of the other items of metadata within the block header 301, produces a hash output that satisfies the difficulty level of the cryptographic puzzle as defined by the difficulty value. For instance, the consensus mechanism may require that the resulting hash of the block header 301 falls below a certain value threshold (e.g., the hash value must start with a certain number of zeroes, as defined by the difficulty value).

A subsequent block 301 may be appended to the genesis block 300 to serve as the next block in the blockchain. Like all other blocks, the subsequent block 300 comprises a block header 311 and block data 319. Similarly, the block header 311 comprise a block root hash 313 of the data within the block data 319 and a block timestamp 314. The block header 311 may further comprise a previous block pointer 312, which may be a hash calculated by combining the hashes of the metadata (e.g., the genesis block root hash 303, genesis block timestamp 304, and the like) within the block header 301 of the genesis block 300. In this way, the block pointer 312 may be used to identify the previous block (i.e., the genesis block 300) in the blockchain 150, thereby creating a "chain" comprising the genesis block 300 and the subsequent block 301.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 302 or "proposed block" may be submitted for addition to the blockchain 150. The pending block 302 may comprise a pending block header 321, which may comprise a pending block root hash 323, a previous block pointer 322 that points to the previous block 301, a pending block timestamp 324, and pending block data 329. Once a pending block 302 is submitted to the system, the nodes within the system may validate the pending block 302 via a consensus algorithm. The consensus algorithm may be, for instance, a proof of work mechanism, in which a node determines a nonce value that, when combined with a hash of the block header 311 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 311 is included in the pending block header 321 of the pending block 302 as the previous block pointer 322. The pending block header 321 may further comprise the pending block root hash 323 of the pending block data 329 which may be calculated based on the winning solution. The pending block 302 is subsequently considered to be appended to the previous block 301 and becomes a part of the blockchain 150. A pending block timestamp 324 may also be added to signify the time at which the pending block 302 is added to the blockchain 150. In other embodiments, the consensus mechanism may be based on a total number of consensus inputs submitted by the nodes of the blockchain 150, e.g., a PBFT consensus mechanism. Once a threshold number of consensus inputs to validate the pending block 302 has been reached, the pending block 302 may be appended to the blockchain 150. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block.

FIG. 4 is a process flow for generating a unique signature profile for authentication, in accordance with some embodiments of the present disclosure. The process begins at block 400A, where the system receives user identifier data 400A. The user identifier data may comprise user biometrics and/or other signatures or identifiers to be used in detecting the identity of the user. For instance, the user identifier data may comprise data such as face biometric data, voice and/or speech biometric data, signature biometric data, movement and/or gait biometric data, biometric data from wearable devices, user behavior data (e.g., location data, user input patterns such as keystroke cadence or mouse click patterns, access frequency of certain entity products and/or services, or the like), or the like). The user identifier data may further comprise user reference data such as the user's biographical information, contact information (e.g., physical and/or digital addresses, phone numbers, or the like), or other types of identifying data. The system may continuously collect user identifier data and update accordingly. For instance, the system may monitor incoming data records for reference data (e.g., a phone number of the user). If the data record containing reference data is appended to the blockchain, the system may take said reference data as valid and update the profile of the user to reflect the new phone number.

In parallel to block 400A, the system may execute block 400B, where the system receives device identifier data. The device identifier data may include device serial and/or part numbers, device hardware identifiers, software, driver, kernel, and/or operating system information, or other types of device reference data. The device identifier data may further include unique hardware variances of the device, such as chip fault, hardware wear patterns, battery depletion patterns, memory imperfections, performance characteristics, and other types of unique, device-specific biometric data. The device identifier data may be continuously collected by the system over time to create a unique device identifier profile.

The process may continue to block 401, where the system generates a unique signature profile using the user identifier data and the device identifier data. By taking certain features and/or identifiers from both the device identifier profile and the user identifier profile, the system may generate a hybrid device and user identifier profile which may be used to authenticate unknown users and/or devices. In some embodiments, the hybrid profile may not contain the full biometric profile of either the user or device. For instance, the hybrid profile may exclude certain types of sensitive or confidential identifying information.

The process continues to block 402, where the system, in response to receiving an authentication request, injects the unique signature profile as reference data. The system may then compare the reference data to the authentication credentials received from the user and/or the device. The unique signature profile may be used by the system to perform authentication in a number of different scenarios. Different segments of the signature profile may be used depending on the object to be authenticated. In this way, the system may be able to dynamically and securely resolve a broad range of authentication issues that may be encountered by the entity.

For instance, in some embodiments, the authentication data received from the user may match the user profile within the reference data, while the data received from the device may not match the device profile. In such embodiments, the process may continue to block 403A, wherein the system completes authentication of the unknown device. In this regard, the system may notify the user that the device from which the user is accessing the system has not been recognized. The system may then prompt the user to authorize the addition of the new device to the list of trusted devices. In some embodiments, the system may request additional authentication data from the user before allowing the user to add another trusted device. Once the user has added the new trusted device, a record of the addition of the device may be submitted to the blockchain for approval by the validator nodes.

In other embodiments, the authentication data received from the device may match the device profile within the reference data, whereas the data received from the user may not match the user profile. In such embodiments, the system may take steps to verify the identity of the unidentified user. For instance, certain characteristics of the user may have changed temporarily or over time (e.g., the user has a cold such that the user's voice does not match voice biometric data, the user's facial features have changed over time, or the like). Accordingly, the system may request additional authentication credentials from the user and/or update the reference data once the user has been authenticated. In some embodiments, if the user cannot be successfully activated (e.g., because the device has been compromised and is being used by an unauthorized user), the system may consider reject the authentication of the user and create a record of the rejection.

In yet other embodiments, the authentication data received from both the device and the user may positively match the combined signature of the device and user as seen in the reference data. In such embodiments, the system may consider the user and device to have been authenticated and thereby allow the user to execute certain authorized actions within the entity system (e.g., conducting transactions, changing account information, adding trusted devices and/or third parties, or the like).

FIG. 5 is a process flow for validating data records in a hybrid blockchain, in accordance with some embodiments of the present disclosure. The process begins at block 500, where the system detects a request to add a proposed data record to the blockchain. Typically, the proposed data record is associated with a certain action that a user wishes to take within the entity system. For instance, a data record may be proposed when the user wishes to become authenticated, conduct a transaction, add trusted devices, change account information, view account, transaction, or historical information associated with the user, or the like. In some embodiments, such a request may implicate a change or update to reference data. For example, if the user wishes to change a phone number associated with the user's account, the reference data associated with the user's phone number must be updated. Accordingly, the request to add a proposed data record may further comprise a request to update certain reference data.

The process continues to block 501, where the system executes, from smart contract logic, validation processes on the proposed data record. The smart contract logic may reflect the unique roles of various nodes, groups and/or subgroups within the blockchain system. Accordingly, the smart contract logic, as well as the validation roles that a particular node fills within the system, may differ according to the entity that owns the node, the security score of the node, the trustworthiness of the node, characteristics of reference data stored on the node, change rules and verification rules, the group and/or subgroup to which the node belongs, redundancies across groups, the weight of the consensus inputs, the particular responsibilities of the particular node, or the like. In other words, by executing the unique smart contract logic stored therein, each node and/or group or subgroup may fulfill particular roles in the consensus process (e.g., validating data records).

Upon executing the smart contract logic, the validating nodes may perform various types of validation checks to evaluate the validity of the proposed data record. For instance, the nodes may verify that the proposed data record contains a valid action (e.g., the account referenced in the proposed data record correctly refers to an existing account, the action to be taken is an action that the user is authorized to take, or the like), that the user and/or device has been authenticated to perform the action requested, or the like. Accordingly, certain nodes may reference different types of data (e.g., reference data, biometric data, location data, or the like) in performing validation checks on the proposed data record. For instance, certain nodes may check the location history data of the device used to submit the proposed data record, while others may verify the authentication checks performed on the device (e.g., checking of device and/or user biometric or identifier data).

In some embodiments, a particular group or subgroup of nodes (or "validation nodes") may perform the initial validation of the proposed data record. In such embodiments, the process continues to decision block 502, where the system analyzes the collective consensus output of each node within the selected group or subgroup. Each node within the group or subgroup may have a different stake in the system, and thus the nodes having greater stakes may proportionally have a greater influence on determining the validity of the proposed data record. In some embodiments, the system may require that each node within the subgroup has positively verified the proposed data record before continuing to the next step. In other embodiments, the system may establish a certain threshold that must be met (e.g., specific nodes, a threshold number of nodes, a threshold amount of stake, or the like) before moving to the next step. If the validation criteria set by the system (e.g., in the smart contract) are not met by the nodes, the system may move to block 503, where the system rejects validation of the proposed data record.

However, if the validation criteria is met (e.g., all nodes within the validating subgroup have positively verified the proposed data record), the process continues to block 504, where the system consolidates the consensus outputs of the subgroups. At this step, the system may aggregate the consensus outputs such that a second group or subgroup of nodes (or "evaluation nodes"), which may be tasked with evaluating the validity of the consensus reached by the validation nodes, may access the aggregated consensus outputs. The evaluation nodes may, according to the smart contract logic stored therein, evaluate the consensus outputs of the validation nodes based on whether the validation nodes faithfully executed the validation according to the smart contract, that the validation node was authorized to participate in initial consensus (e.g., the validation node belongs to the validation subgroup), that the nodes have a requisite level of trustworthiness, that the nodes have up-to-date security measures and/or protocols, or the like.

The process may continue to decision block 505, where the evaluation nodes determine whether the consolidated consensus outputs of the validation nodes are valid. If the evaluation nodes determine that the consolidated consensus outputs of the validation nodes are invalid, then the process may conclude at block 503, where the system rejects validation of the proposed data record. However, if the evaluation nodes determine that the consolidated consensus outputs are valid, then the process may continue to block 506, where the system appends the proposed data record to the blockchain. At this stage, the system has determined, through the various subgroups of nodes, that the proposed data record is valid. In accordance with said determination, the system may authorize the user to take the requested action (e.g., change account information, conduct transactions, or the like). The system may further update the reference data stored on one or more nodes based on the determination. For instance, if the requested action was to change a phone number associated with the user, the system may update the reference data stored in the entity's nodes to reflect the change in phone number. In some embodiments, the system may report the rejection or approval of the proposed data record back to the entity. By using the hybrid blockchain and the combined user-device signatures as described herein, an entity may realize a secure way to authenticate users and manage user data and interactions.

FIG. 6 is a process flow for validating data records via weighted group consensus outputs, in accordance with some embodiments of the present disclosure. As depicted in FIG. 6, a set of first group nodes 111, 112 in a first group 110 may generate a first consensus output with respect to a proposed data record, whereas a set of second group nodes 121, 122 in a second group 120 may generate a second consensus output. It should be understood that the "groups" as represented in FIG. 6 may also represent different subgroups of nodes. It should further be understood that while two groups are depicted in FIG. 6 as having two nodes per group, the system may take into account the consensus outputs of any number of groups, subgroups, and/or nodes. In some embodiments, the first consensus output and the second consensus output may be assigned different weight values based on the group or subgroup type. At block 600, the system may perform consolidation of the group outputs (e.g., the first consensus output and the second consensus output) by aggregating the consensus outputs of all groups, subgroups, and/or nodes that submit initial consensus inputs. The consolidated consensus outputs may further take into account the various weights (e.g., stakes) of the groups, subgroups, and/or nodes.

Once the consolidated consensus output is generated, one or more independent groups of nodes may consensus inputs on the consolidated consensus output, as seen in block 601. For instance, in one embodiment, a third group and/or a fourth group which do not participate in the initial consensus output process may be designated to oversee the consensus outputs of the initial group (e.g., the first group 110 and the second group 120) and perform validation of said consensus outputs.

The process may then move to block 602, where the blockchain makes a decision as to the validity of the proposed data records based on the initial consolidated consensus output as well as the consensus inputs of the independent groups as to the validity of the consolidated consensus output. In some embodiments, the system may generate a report of the outcome of the validation process (e.g., whether or not the proposed data record is to be added to the blockchain) and transmit the report to the entity.

Finally, the process may conclude at block 603, where the system generates a final consensus output. The final consensus output, which may also be assigned a weight or stake by the system, ultimately determines whether the proposed data record will be added to the blockchain.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| To Be Assigned | SYSTEM AND METHOD FOR HIERARCHICAL DECISIONING WITHIN A HYBRID BLOCKCHAIN | Concurrently Herewith |

What is claimed is:

1. A system for device and transaction authentication, comprising:
a processor;
a communication interface; and
a memory having executable code stored thereon, wherein the executable code, when executed by the processor, causes the processor to:
receive user identifier data from a user;
receive device identifier data from a device associated with the user, wherein the device identifier data comprises device biometric data, wherein the device identifier data and the user identifier data are stored within a blockchain, wherein the device identifier data comprises one or more immutable hardware characteristics of the device associated with the user;
generate a unique signature profile from the user identifier data and a device identifier data;
continuously collect historical interaction data associated with the device;
add the historical interaction data to the unique signature profile;
receive an authentication request from a second device associated with a second user;
receive user authentication credentials from the second user;
receive device authentication credentials from the second device;
determine that the user authentication credentials match the user identifier data;
determine that the device authentication credentials do not match the device identifier data;
receive from the user a request to add the second device as a trusted device; and
inject second device identifier data as reference data into the blockchain, wherein the second device identifier data comprises identifier data associated with the second device.

2. The system of claim 1, wherein generating the unique signature profile comprises:
tracking one or more behavioral characteristics associated with the device over time, the one or more behavioral characteristics comprising at least one of response time or battery degradation speed; and
generating a device signature associated with the device based on tracking the one or more behavioral characteristics over time.

3. The system of claim 1, wherein the immutable hardware characteristics comprise manufacturing imperfections, the manufacturing imperfections comprising wear characteristics associated with the device.

4. The system of claim 1, wherein the device identifier data further comprises software characteristics, the software characteristics comprising device applications, screen resolutions, or operating system versions.

5. The system of claim 1, wherein the user identifier data comprises user biometric data.

6. The system of claim 1, wherein the executable code further causes the processor to:
receive an authentication request from the device associated with the user;
receive user authentication credentials from the user;
receive device authentication credentials from the device associated with the user;
determine that the user authentication credentials do not match the user identifier data;
determine that the device authentication credentials match the device identifier data; and
prompt the user to provide additional user authentication credentials.

7. The system of claim 1, wherein the executable code further causes the processor to:
receive an authentication request from the device associated with the user, wherein the authentication request comprises a requested action;
receive user authentication credentials from the user;
receive device authentication credentials from the device associated with the user;
determine that the user authentication credentials match the user identifier data;
determine that the device authentication credentials match the device identifier data; and
authorize the user to complete the requested action.

8. A system for device and transaction authentication, comprising:
a processor;
a communication interface; and
a memory having executable code stored thereon, wherein the executable code, when executed by the processor, causes the processor to:
receive user identifier data from a user;
generate a unique device identifier profile for a device associated with a user;
continuously detect device identifier data from the device, wherein the device identifier data comprises hardware characteristics of the device tracked over time, wherein the device identifier data is stored within a blockchain, wherein the device identifier data comprises one or more immutable hardware characteristics of the device associated with the user;
add a detected hardware characteristic to the unique device identifier profile;
continuously collect historical interaction data associated with the device;
add the historical interaction data to the unique device identifier profile;
receive an authentication request from a second device associated with a second user;
receive user authentication credentials from the second user;
receive device authentication credentials from the second device;
determine that the user authentication credentials match the user identifier data;
determine that the device authentication credentials do not match the device identifier data;
receive from the user a request to add the second device as a trusted device; and
inject second device identifier data as reference data into the blockchain, wherein the second device identifier data comprises identifier data associated with the second device.

9. The system of claim 8, wherein generating the unique device identifier profile comprises:
tracking one or more behavioral characteristics associated with the device over time, the one or more behavioral characteristics comprising at least one of response time or battery degradation speed; and
generating a device signature associated with the device based on tracking the one or more behavioral characteristics over time.

10. The system of claim 8, wherein the immutable hardware characteristics comprise manufacturing imperfections, the manufacturing imperfections comprising wear characteristics associated with the device.

11. The system of claim 8, wherein the device identifier data further comprises software characteristics, the software characteristics comprising device applications, screen resolutions, or operating system versions.

12. A computer-implemented method for device and transaction authentication, the method comprising:
receiving user identifier data from a user;
device identifier data from a device associated with the user, wherein the device identifier data comprises device biometric data, wherein the device identifier data and the user identifier data are stored within a blockchain, wherein the device identifier data comprises one or more immutable hardware characteristics of the device associated with the user;
generating a unique signature profile from the user identifier data and a device identifier data;
continuously collecting historical interaction data associated with the device;
adding the historical interaction data to the unique signature profile;
receiving an authentication request from a second device associated with a second user;
receiving user authentication credentials from the second user;
receiving device authentication credentials from the second device;
determining that the user authentication credentials match the user identifier data;
determining that the device authentication credentials do not match the device identifier data;
receiving from the user a request to add the second device as a trusted device; and
injecting second device identifier data as reference data into the blockchain, wherein the second device identifier data comprises identifier data associated with the second device.

13. The computer-implemented method of claim 12, wherein generating the unique signature profile comprises:
tracking one or more behavioral characteristics associated with the device over time, the one or more behavioral characteristics comprising at least one of response time or battery degradation speed; and
generating a device signature associated with the device based on tracking the one or more behavioral characteristics over time.

14. The computer-implemented method of claim 12, wherein the immutable hardware characteristics comprise manufacturing imperfections, the manufacturing imperfections comprising wear characteristics associated with the device.

15. The computer-implemented method of claim 12, wherein the device identifier data further comprises software characteristics, the software characteristics comprising device applications, screen resolutions, or operating system versions.

16. The computer-implemented method of claim 12, wherein the user identifier data comprises user biometric data.

* * * * *